Dec. 11, 1956  R. R. ROBERTS  2,773,725
WORK TABLES FOR BORING MILLS AND THE LIKE
Filed Oct. 14, 1953  2 Sheets-Sheet 1
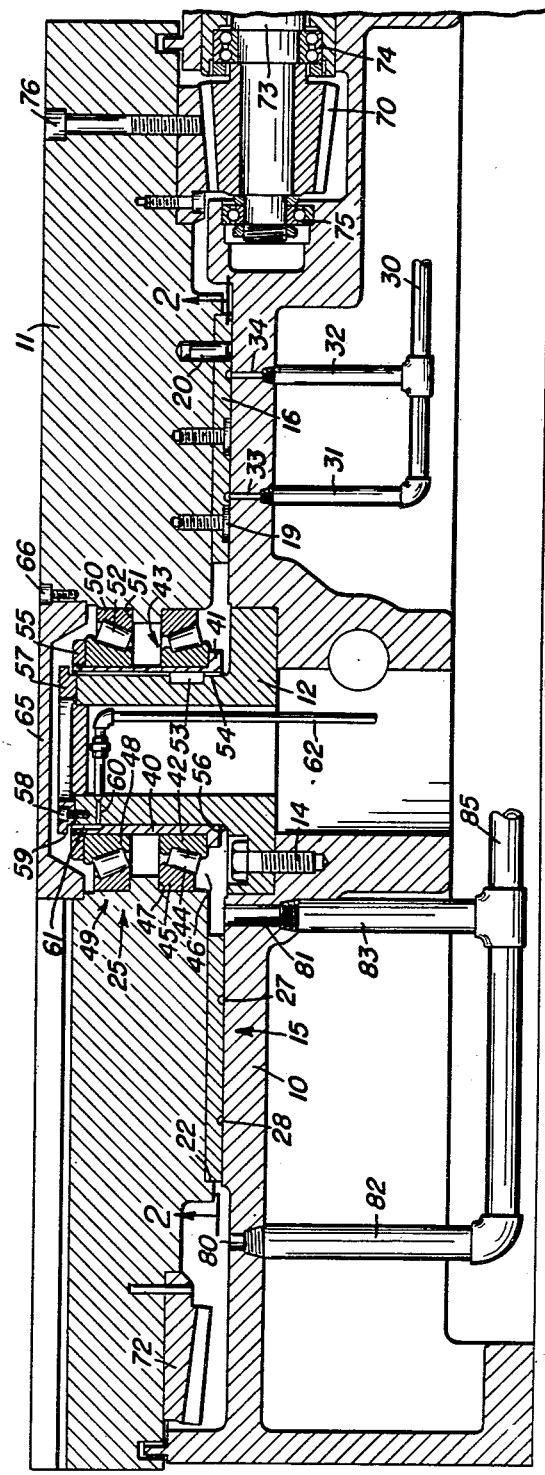
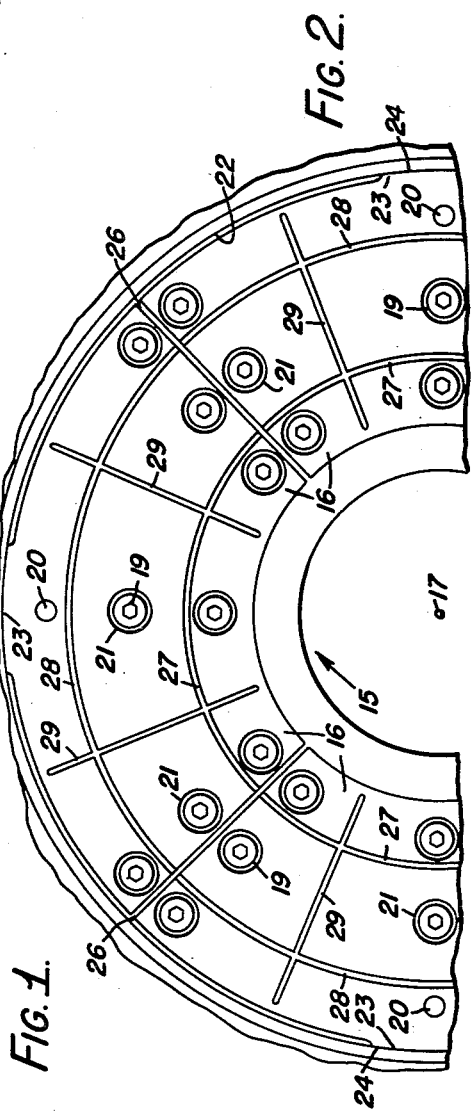
INVENTOR.
ROLAND R. ROBERTS
BY
ATTORNEY Dec. 11, 1956  R. R. ROBERTS  2,773,725
WORK TABLES FOR BORING MILLS AND THE LIKE
Filed Oct. 14, 1953  2 Sheets-Sheet 2
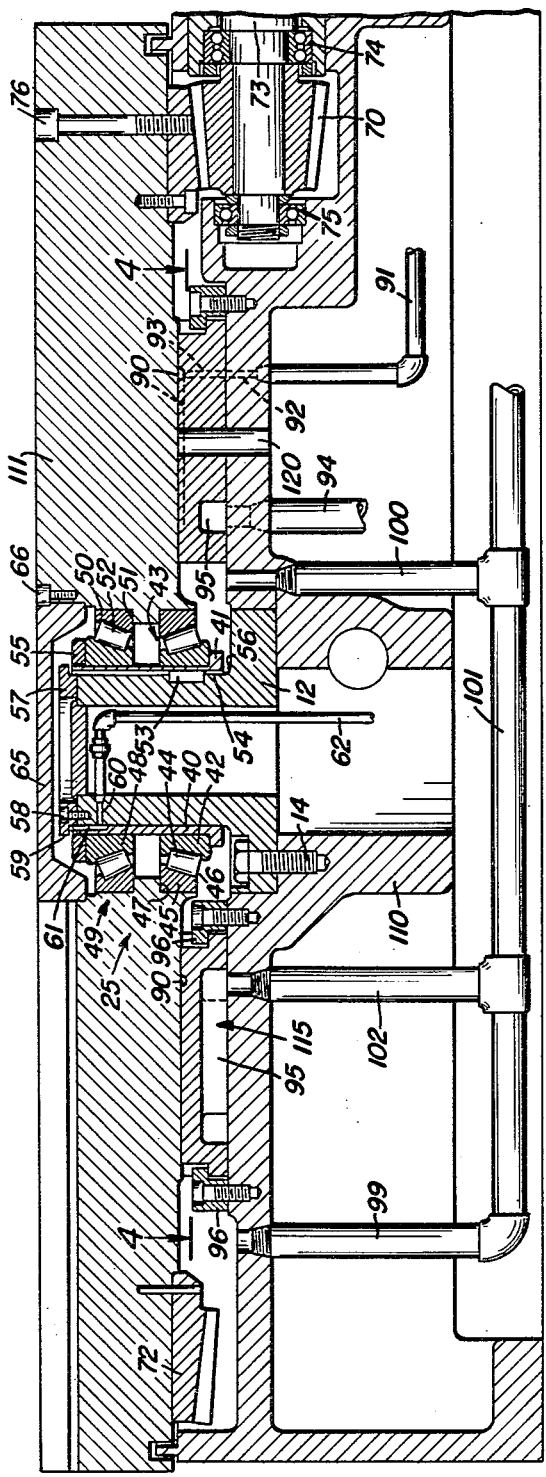
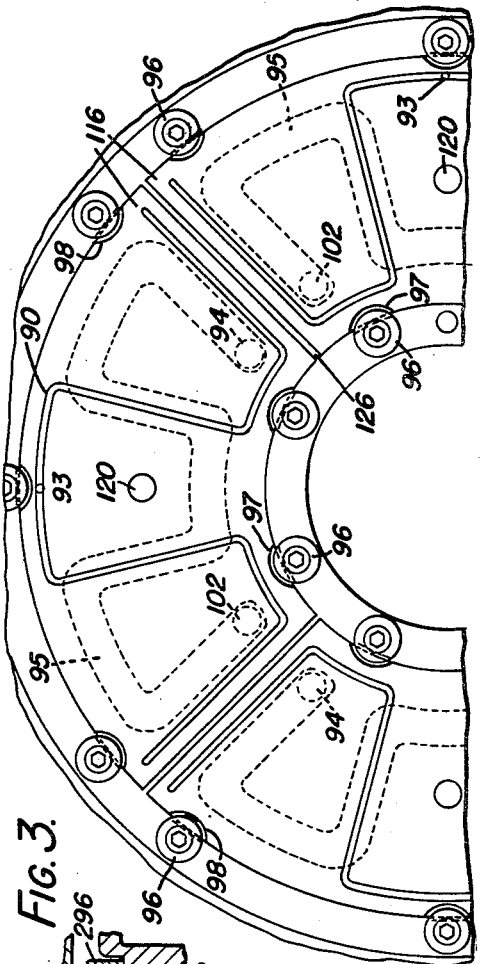
FIG. 3.
FIG. 5.
FIG. 4.
INVENTOR.
ROLAND R. ROBERTS
BY
ATTORNEY United States Patent Office 2,773,725
Patented Dec. 11, 1956

2,773,725

WORK TABLES FOR BORING MILLS AND THE LIKE

Roland R. Roberts, Irondequoit, N. Y., assignor, by mesne assignments, to Farrel-Birmingham Company, Incorporated, Ansonia, Conn., a corporation of Connecticut Application October 14, 1953, Serial No. 386,047

8 Claims. (Cl. 308—77)

The present invention relates to machine tools and more particularly to the mountings of rotary work tables for vertical boring mills and the like.

Vertical boring mills are adapted to operate upon relatively large and heavy work pieces. When a turning or facing operation is being performed upon a vertical boring mill, the cutting tool or tools at times during the operation will exert considerable leverage on the work, especially when cutting at and adjacent to the periphery of the work at or adjacent the upper face thereof. This will cause the table, unless properly mounted, to be tilted or canted with the result that the desired accuracy will not be attained in the turning or facing operation.

Attempts have been made in the past to hold the work table in proper relation to the bed of the machine during cutting by mounting the table centrally on opposed conical anti-friction bearings in such way as to prevent any upward displacement of the table. The axial thrust of the cut was then further taken by a plain bearing adjacent the periphery of the table. It was found in practice, however, that the heat generated by the load on both types of bearings caused the table to bow, and to place additional load on the plain bearing requiring an excessive amount of power for rotating the table.

In an attempt to overcome this, it has been proposed to mount the table centrally on a single row combined anti-friction radial and thrust bearing, and further to take the axial thrusts by an anti-friction, axial thrust bearing disposed between the table and the bed near the periphery of the table. In one construction, the combined radial and thrust bearing was preloaded, thereby also preloading the axial thrust bearing. Because of the preloading, however, heat is generated, and the table will bow and pull up the central bearing, causing reaction and additional loading on the outer bearing, resulting in further friction and generation of heat. Hence, despite use of anti-friction radial and thrust bearings excessive power is again required to drive the work table and the desired accuracy is not attained in the work. In my copending application Serial No. 365,170, filed June 30, 1953, I have disclosed another construction in which the table is centered by an anti-friction combined radial and axial thrust bearing and the axial thrust is further taken by an additional anti-friction, axial thrust bearing which is disposed between the table and the bed or support on which the table is rotatable, and which is mounted between the central bearing and periphery of the table. In this case, the central bearing is mounted to be free to float axially to avoid overloading the outer, axial thrust bearing.

Anti-friction axial thrust bearings of the size required in either of the two last-described structures are, however, costly. Plain bearings are less expensive, easy to manufacture, and easy to assemble. Moreover, a plain bearing by nature provides a broad support for the table increasing the accuracy of cut. Heretofore, however, such plain bearings as have been devised for boring mill table mountings have been difficult to lubricate properly, and in use have generated a great amount of heat, causing distortion of the table.

One object of the present invention is to provide a mounting for a rotary table of the character described which will permit the use of a plain bearing for supporting the weight of the table and taking the axial thrust, and which at the same time will permit the table to run free under operating conditions.

Another object of the invention is to provide a mounting for a rotary work table which will permit of the use of a plain bearing for supporting the table and yet which will permit the table to adjust itself automatically to compensate for any tendency of the table to bow, thereby obviating loading of the plain bearing.

Another object of the invention is to provide a mounting for a rotary work table of the character described, in which the bearing that centers the table is free to float so as to adjust itself should the table tend to bow, thereby avoiding any need for excessive power to rotate the table and any overloading of the plain bearing.

Another object of the invention is to provide a mounting for a rotary work table in which the table is centered by a combined radial and axial thrust anti-friction bearing and in which the axial thrust is further taken by a plain bearing which is disposed between the table and the bed or support, on which the table is rotatable, and which is mounted between the central bearing and the periphery of the table, and in which the central bearing is free to float axially to avoid overloading the plain bearing.

Other objects of the invention will be apparent hereinafter from the specification and from the recital of the appended claims.

In the drawings:

Fig. 1 is a vertical section taken centrally of the work table of a boring mill showing a table mounting constructed according to one embodiment of this invention;

Fig. 2 is a fragmentary section taken on the line 2—2 of Fig. 1, looking in the direction of the arrows;

Fig. 3 is a vertical section, similar to Fig. 1, showing a table mounting constructed according to a modification of the invention;

Fig. 4 is a fragmentary section, similar to Fig. 2 but taken on the line 4—4 of Fig. 3, looking in the direction of the arrows; and Fig. 5 is a fragmentary axial section showing a table mounting constructed according to a still further embodiment of the invention, and particularly illustrating the plain bearing of this mounting.

Referring now to the drawings and first to the embodiment of the invention shown in Figs. 1 and 2, 10 denotes the base or bed of the boring mill and 11 is the work table which is rotatably mounted thereon. The table is centered by a post 12 which is disposed centrally of the table in a central bore thereof and which is secured to the bed by screws 14.

The table is adapted to be supported from the base or bed 10 by a plain bearing 15 and by a combined axial and radial thrust anti-friction bearing denoted as a whole at 25. The plain bearing 15 is in the form of a plurality of arcuate segments 16 which are mounted to be concentric and which are coaxial with the axis 17 of the table. Each plate 16 has parallel plain upper and lower surfaces. Each plate is secured to the under-face of the table 11 by eight screws 19 and a dowel pin 20. The undersurface of the table 11 is turned to have a circular shoulder 22 and each plate 16 is formed with a protrusion or extension 23 at one side that has a surface 24 abutting against this shoulder. Each plate 16 is slightly spaced apart angularly from the next adjacent plates, so that gaps 26 are left between adjacent plates for expansion.

The dowels 20 hold each plate radially but the heads of the screws 19 are of smaller diameter than the recesses or counterbores 21 in which they fit so that each plate 16 has freedom of movement about its dowel 20 as a pivot, being held radially only by the protrusion 23 seating against the shoulder 22 and being free to pivot about the dowel 20 and therefore to expand in any direction except radially.

For lubrication purposes the plates 16 have parallel arcuate grooves 27 and 28 in their undersurfaces that are connected by radial grooves 29, which extend close to the inside and close to the outside edges of each plate. Oil is supplied to the grooves 27, 28 and 29 through a high pressure line 30 having leads 31 and 32 which connect with ducts 33 and 34, respectively, that communicate with the grooves 27 and 28, respectively. The grooves 27 and 28 of the different plates are in registry, respectively, with the grooves 27 and 28 of adjacent plates.

The bearing plates 16 are made of an aluminum alloy. A suitable alloy is composed by weight of 6.5% tin, 1% copper, .5% nickel, 2.5% silicon, and the remainder aluminum. Such an alloy will retain its resistance to fatigue at elevated temperatures better than common bearing materials. It has the property of transferring heat much more rapidly than steel or babbitt. There are no bonding planes to act as heat dams. Localized high temperatures are reduced by rapid heat dissipation and transfer to the outer surfaces. Such an alloy has high compressive strength and overcomes any tendency to squeeze out under load. The screws 19 and dowels 20 are preferably made of the same material as the bearing plates 16 themselves.

The bearing 25 is similar to the central bearing described in my pending application above referred to. It comprises a sleeve 40 which has an outwardly projecting flange 41 at its lower end. This flange serves to support the inner race 42 of a lower conical roller bearing which is designated as a whole at 43, and which comprises the tapered rollers 44, and the outer raceway 45. This bearing 43 fits into the central bore 46 of the table and against the shoulder 47 formed by a counterbore of enlarged diameter extending upwardly from the lower face of the table. The sleeve 40 also serves to support the inner race 48 of an upper taper roller bearing which is denoted as a whole at 49. This bearing is supported upon a shoulder 51 formed by a counterbore at the upper end of the bore 46. The taper rollers of this bearing 49 are designated at 52; and its outer raceway is denoted at 50.

The two bearings 43 and 49 are opposed tapered roller bearings and may be of conventional construction. A nut 55 which threads onto the sleeve 40 and which engages the upper face of the inner race 48 of the upper bearing 49 serves to permit preloading of the bearings 43 and 49. The sleeve 40 is held by a key 53 against rotation relative to post 12 but is, however, free to float vertically on the post 12, its upward movement being limited by the stop ring 57. Key 53 engages in an axial groove 54 in the sleeve. The stop ring 57 is secured to the hub or post 12 by screws 58. It is faced off on its under surface to have a clearance of approximately .010 inch with reference to the upper face of the sleeve 40, thereby to permit .010 inch upward floating movement of the sleeve.

The tapered roller bearings are lubricated through a duct 60 which extends radially through the hub 12 and which is supplied with a suitable lubricant by the pipe 62. Duct 60 communicates with a groove 61 in sleeve 40 which carries the lubricating oil to the top of bearing 49.

The bore of the table is closed at its upper end by a cap 65. The latter may be held in position by cap screws 66 which are countersunk into the table 11 and which engage recesses formed around the periphery of the cap 65.

Through the anti-friction bearings 43 and 49, the table is accurately centered and rotatably supported on the post 12. It is driven by a bevel pinion 70 and a mating bevel gear 72. Pinion 70 is keyed to a drive shaft 73 which is journaled on anti-friction bearings 74 and 75 in the bed 10 of the machine. The gear 72 itself is secured to the underside of the table 11 by screws 76 and 77.

The oil from the bearings 43 and 49, from the bearing 15, and from the plates or tracks 16 is drained away to the sump of the machine through ducts 80 and 81 disposed at opposite ends radially of the plain bearing 15 and communicating with pipes 82 and 83, respectively, that are connected to the drain pipe 85.

With the construction described, there is no preloading of the central bearings 43 and 49 against the plain bearing 15. Hence, there is no tendency for preload to cause any heating up of the table. Moreover, should the table distort for any reason, there is no additional load placed upon the plain bearing 15, for the sleeve 40 which supports the bearings 43 and 49, is free to float vertically, and will adjust itself automatically to the proper operating position. This floating central anti-friction bearing will prevent overloading the plain thrust bearing and will adjust itself automatically to the proper operating position, in effect, compensating for any bow that might be produced by the table heating up due to friction in the plain bearings or due to hot chips falling on it from the work, etc. The table will run free under normal operating conditions. Furthermore, the plain bearing itself being made of an aluminum tin alloy resists any tendency to heat up and gall, and, therefore, tends to hold the table firmly and accurately on a broad support. The aluminum alloy used in the plain bearings is a carrying medium for the tin, which is a lubricant. The tin is left in minute globules, throughout the aluminum. It gives bearing carrying capacity. The aluminum holds the tin globules together. The invention, therefore, provides a smooth running mounting for the table, which will oeprate freely at all times with a very low coefficient of friction and with low power consumption, and which will insure the accuracy desired in turning, facing, or boring of a workpiece.

In the embodiment of the invention shown in Figs. 3 and 4, the central bearing mounting is the same as previously described and will be identified by the same reference numerals. In this case, however, the plain bearing, here denoted at 115, is secured to the bed 110 of the machine rather than to the table 111.

The plain bearing here comprises a plurality of plates 116 which have undulatory grooves 90 in their upper surfaces. High pressure oil is supplied to these grooves from a pipe 91 which has several branches, of which only one is shown, that communicate with ducts 92 in the bed 110 and with aligned ducts 93 in the several plates. Each duct 93 communicates with the groove 90 in one of the plates.

The plates are cooled by a high volume of low pressure oil supplied to them through a pipe 94 which has as many branches as there are plates. Each branch communicates with an undulatory groove 95 formed in the undersurface of the associated plate. The grooves 90 and 95 in each plate 116 are reversely disposed to each other as clearly shown in Fig. 4. The oil is drained from the outer and inner radial sides of the plates through lines 99 and 102 which lead to the drain pipe 101 that returns the oil to the sump.

As before, the plates are spaced slightly from one another so that gaps 126 are provided between adjacent plates for expansion. The plates are held on the base 110 by buttons or lugs 96 and dowel pins 120. The buttons or lugs 96 engage recesses 97 and 98 around the outer and inner boundaries of the plates, and thread into the base 110. The recesses 97, 98 have clearance with reference to the lugs or buttons 96, and the dowel pins 120 can serve as pivots, therefore, for the separate plates. The plates are held, therefore, against radial movement but are free to adjust themselves angularly with expansion. Otherwise the structure is the same as in the first described embodiment of the invention.

A further embodiment of the invention is illustrated in Fig. 5. Here the plain bearing plates 215, of which only one is shown, are again secured to the base, denoted at 210, by lugs or buttons 296. High pressure oil is supplied to a groove 290 in the upper face of each track through a pipe 291 that passes through an opening in the base or bed 210. Each pipe 291 communicates with a duct 293 in the plate or track; and this duct, in turn, communicates with the groove 290. Groove 290 is in juxtaposition to table 211 and so the lubricant is supplied where needed. In this embodiment of the invention, however, some medium other than oil, such as water, can be used to cool the plates or tracks 215. For this reason the plates or tracks 215 must be hollowed out as denoted at 295 to contain the coolant and prevent it from getting onto the bed or the tracks. The coolant is supplied to each hollow plate or track 215 through a pipe 294 and may flow out of the plate or track through a similar pipe (not shown).

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine tool, a bed, a work table rotatably mounted on said bed, and a plain bearing disposed between said table and said bed and secured to one of these two parts to engage the other of said two parts to take axial thrust, said plain bearing comprising a plurality of sector-plates concentric to the axis of said table, each of said plates being spaced slightly angularly from the adjacent plates, a dowel pin passing through each plate into said one part to locate each plate on said one part, and separate fastening means for holding each plate to said one part, said separate fastening means engaging in holes of the plates that are larger than said fastening means to permit expansion of the plates, each plate having a radially-extending protrusion thereon at its radially outer side, and one of said two parts having an annular shoulder concentric with said axis and against which the protrusions of all the plates seat, whereby each plate is held against movement radially of said axis.

2. In a machine tool, a bed, a work table rotatably mounted on said bed, and a plain bearing disposed between said table and said bed and secured to one of these two parts to engage the other part to take axial thrust, said plain bearing comprising a plurality of sector plates concentric to the axis of said table, each of said plates being spaced angularly slightly from the adjacent plates to permit expansion, means for securing each plate to said one part against movement radially of said axis, said plates being mounted to be free to have limited movement for expansion angularly about said axis, each of said plates being provided with undulatory grooves on its opposite side faces, the grooves on one side of each plate having their undulations reversed with reference to the grooves on the opposite side of each plate, means for supplying high pressure lubricant to the set of grooves in the face which engages said other part, and means for supplying a low pressure coolant in high volume to the grooves in the other face, each of said plates being made of a metal alloy containing a metal having lubricating qualities.

3. In a machine tool, a bed, a work table rotatably mounted on said bed, and a plain bearing disposed between said table and said bed and secured to one of these two parts to engage the other part to take axial thrust, said plain bearing comprising a plurality of sector plates concentric to the axis of said table, each of said plates being spaced angularly slightly from the adjacent plates to permit expansion, means for securing each plate to said one part against movement radially of said axis, said plates being mounted to be free to have limited movement for expansion angularly about said axis, each of said plates being provided with undulatory grooves on its opposite side faces, the grooves on one side of each plate having their undulations reversed with reference to the grooves on the opposite side of each plate, means for supplying high pressure lubricant to the set of grooves in the face which engages said other part, and means for supplying a low pressure coolant in high volume to the grooves in the other face, each of said plates being made of an aluminum-tin alloy.

4. In a machine tool, a bed, a vertically-extending post disposed centrally of said bed, a work table rotatably mounted on said bed and having a central bore to receive said post, a sleeve slidably mounted on said post, means secured to said post and normally spaced from the upper end of said sleeve to limit upward movement of said sleeve on said post, a combined radial and axial thrust bearing mounted on said sleeve between said table and said sleeve for centering the table on said bed, and a plain bearing disposed between said table and said bed radially outwardly of the thrust bearing, said plain bearing comprising a plurality of sector plates which have parallel plane sides and which are arranged concentric with the axis of said table, each of said plates being spaced slightly angularly about said axis from the adjacent plates, and each of said plates being made of a metal alloy containing a metal having lubricating qualities.

5. In a machine tool, a bed, a vertically disposed post on said bed, a work table rotatably mounted on said bed and having a central bore to receive said post, a sleeve slidably mounted on said post for limited axial movement relative thereto, means secured to said post and normally spaced from the upper end of said sleeve to limit upward movement of said sleeve on said post, a combined radial and axial thrust bearing mounted on said sleeve between said table and said sleeve for centering the table on said post, and a plain bearing disposed between said table and said bed radially outwardly of the thrust bearing, said plain bearing comprising a plurality of sector plates which have parallel plane sides and which are arranged concentric with the axis of said table, each of said plates being spaced slightly angularly about said axis from the adjacent plates, means for securing each plate against movement in one direction, said plates being mounted to be free to have limited movement for expansion in other directions, and each of said plates being made of a metal alloy containing a metal having lubricating qualities.

6. In a machine tool, a bed, a vertically disposed post on said bed, a work table rotatably mounted on said bed and having a central bore to receive said post, a sleeve slidably mounted on said post for limited axial movement relative thereto, means secured to said post and normally spaced from the upper end of said sleeve to limit upward movement of said sleeve on said post, a combined radial and axial thrust bearing mounted on said sleeve between said table and said sleeve for centering the table on said post, and a plain bearing disposed between said table and said bed radially outwardly of the thrust bearing, said plain bearing comprising a plurality of sector plates which have parallel plane sides and which are arranged concentric with the axis of said table, each of said plates being spaced slightly angularly about said axis from the adjacent plates, means for securing each plate against movement in one direction, said plates being mounted to be free to have limited movement for expansion in other directions, and each of said plates being made of an aluminum-tin alloy.

7. In a machine tool, a bed, a vertically disposed post on said bed, a work table rotatably mounted on said bed and having a central bore to receive said post, a sleeve slidably mounted on said post for limited axial movement relative thereto, means secured to said post and normally spaced from the upper end of said sleeve to limit upward movement of said sleeve on said post, a combined radial and axial thrust bearing mounted on said sleeve between said table and said sleeve for centering the table on said post, and a plain bearing disposed between said table and said bed radially outwardly of the thrust bearing, said plain bearing comprising a plurality of sector plates which have parallel plane sides and which are arranged concentric with the axis of said table, each of said plates being spaced slightly angularly about said axis from the adjacent plates, means for securing each plate against radial movement outwardly of said axis, said plates being mounted to be free to have limited movement for expansion in other directions, and each of said plates being made of a metal alloy containing a metal having lubricating qualities.

8. In a machine tool, a bed, a vertically disposed post on said bed, a work table rotatably mounted on said bed and having a central bore to receive said post, a sleeve slidably mounted on said post for limited axial movement relative thereto, means secured to said post and normally spaced from the upper end of said sleeve to limit upward movement of said sleeve on said post, a combined radial and axial thrust bearing mounted on said sleeve between said table and said sleeve for centering the table on said post, and a plain bearing disposed between said table and said bed radially outwardly of the thrust bearing, said plain bearing comprising a plurality of sector plates which have parallel plane sides and which are arranged concentric with the axis of said table, each of said plates being spaced slightly angularly about said axis from the adjacent plates, means for securing each plate against radial movement outwardly of said axis, said plates being mounted to be free to have limited movement for expansion in other directions, and each of said plates being made of an aluminum-tin alloy.

References Cited in the file of this patent

UNITED STATES PATENTS

| | | |
|---|---|---|
| 1,260,686 | Kingsbury | Mar. 26, 1918 |
| 1,900,924 | Firth | Mar. 14, 1933 |
| 1,997,810 | Cole | Apr. 6, 1935 |
| 2,068,523 | Trosch | Jan. 19, 1937 |
| 2,378,343 | Walter | June 12, 1945 |

FOREIGN PATENTS

| | | |
|---|---|---|
| 271,350 | Great Britain | May 26, 1927 |
| 602,285 | France | Mar. 16, 1926 |

OTHER REFERENCES

"Automotive and Aviation Industries," published June 1, 1946, pages 26–30, 74, 76 and 78 relied on.

Metals Handbook, 1948 edition, published by American Society for Metals. See article on Bearing Materials, pages 753 through 755.